Patented July 26, 1949

2,477,290

UNITED STATES PATENT OFFICE 2,477,290

CATALYST COMPLEXES FOR ALKYLATION PROCESSES

Ralph W. Dornte, Westfield, and David W. Young, Roselle, N. J., assignors to Standard Oil Development Company, a corporation of Delaware No Drawing. Application June 7, 1946, Serial No. 675,300

6 Claims. (Cl. 260—683.4)

This invention relates to processes for the manufacture of high antiknock hydrocarbons, particularly branched chain hydrocarbons which may be useful as a fuel or as a valuable blending agent for improving the combustion characteristics of other hydrocarbons and more particularly relates to the use of more advantageous catalyst mixtures in such processes.

It is known that ordinary motor fuels may be prepared by alkylating olefins containing from 2 to 5 carbon atoms with isoparaffins containing at least one tertiary carbon per molecule, using Friedel-Crafts catalysts, such as aluminum chloride.

However, aluminum chloride is a rather volatile high-melting solid which is relatively insoluble in the hydrocarbon to be alkylated and it is most difficult to secure efficient contact of alkylating agent hydrocarbon and aluminum chloride without the application of excessive quantities of the latter. Furthermore, aluminum chloride and related alkylation catalysts of the Friedel-Crafts type react readily with traces of moisture and/or impurities in the reactants particularly the olefin and/or traces of products of side reactions to form sticky sludge-like material. These sludge-like materials are substantially insoluble in alkylation reaction mixtures and normally remove large quantities of aluminum chloride. They coat the particles of aluminum chloride and prevent proper contact of the catalyst with the alkylating agent and compound being alkylated. This difficulty is further aggravated by the fact that once the catalyst particles become coated with this sludge they tend to agglomerate into hard, sticky lumps. This seriously interferes with continuous methods of carrying out alkylations with these catalysts. Thus, for example, if it is attempted to continuously pass a slurry of aluminum chloride and isoparaffin and alkylating agent through a tubular reactor, it is found that the reactor invariably becomes quickly coated and choked with this sludge-like material. As a result, alkylations carried out with these catalysts require excessive amounts of aluminum chloride and the large proportion of the catalyst is discarded as practically worthless sludge. Furthermore, the alkylation must be carried out batch-wise or intermittently. In the production of fine chemicals where the cost of the catalyst is usually a small fraction of the total cost and operations are carried out in small batches, this inefficient utilization of the catalyst may be of relatively little importance. But in the production of motor fuels by alkylating aromatic and/or tertiary carbon atom-containing aliphatic hydrocarbons with olefins or the like where large-scale operations with inexpensive starting materials are necessary for financial success, the cost of the catalyst must be kept at a minimum. In alkylations of this type, moreover, the prevention of sludge formation and its attendant complications are especially difficult due to presence in the starting material of impurities which promote sludge formation with aluminum chloride and like catalysts.

An important object of the present invention is to provide an alkylation process in which sludge formation is minimized. Another object of the invention is to reduce the consumption of catalyst involved in Friedel-Crafts type of alkylations. A further object is to provide a more economical homogeneous liquid phase method of carrying out alkylations in the presence of aluminum chloride and the like. Additional objects and advantages of the process of the invention will be apparent from the following description.

It has been proposed to employ as alkylation catalysts, complex addition compounds of the Gustavson and Ansolvo-acid types in which aluminum chloride or bromide is bound by secondary valence bonds to one or more organic compounds. These addition compounds are normally liquid and are in certain respects superior to the use of aluminum chloride or bromide alone. Under alkylation conditions, however, the organic components of the complex tend to split off and be substituted by the compound being alkylated and/or to be alkylated by the alkylation agent used. As a result, the composition of the catalyst is difficult to maintain constant and its viscosity tends to change with use so that constant careful supervision is required in order to keep proper proportions in the reaction mixture. Furthermore, these side reactions not only reduce the yield of desired product, but also introduce unwanted impurities. To overcome these disadvantages it has been suggested that complex double salts of aluminum chloride and aluminum bromide such as are produced by reacting these aluminum halides with alkali metal, alkaline earth metal and like halides be used as alkylation catalysts. These double salts are all solid compounds of relatively high melting point and low volatility. They must be used in the solid state because at the temperatures at which they are liquid the equilibrium between the reactants and the alkylation product is unfavorable and the conversions impractically low. It is usual, therefore, to use these catalysts impregnated on porous carriers. In alkylation reactions, such solid catalysts are rapidly coated with reaction products or sludge and soon lose their ability to catalyze the desired alkylation even when frequently subjected to regeneration treatments which of course add to the expense of the process.

In accordance with the present invention, many of the disadvantages of former alkylation and other processes are avoided by substituting for the aluminum halide alkylating agents used therein, a soluble catalyst comprising a complex addition compound of a Friedel-Crafts active metal halide catalyst and an ether. Such etherate complexes are less sensitive to impurities in the feed than the simple Friedel-Crafts catalysts since a much lower concentration of dispersed catalyst in the feed may be effectively used with the complex than with the Friedel-Crafts catalyst itself. Furthermore, the etherate complexes, particularly in the presence of an excess of the complex-forming ether, are not deactivated by poisons at a mol ratio which deactivate the Friedel-Crafts catalyst alone. They permit the use of hydrocarbons and certain halogenated hydrocarbons as solvents in which aluminum chloride or other Friedel-Crafts catalyst is insoluble. The ethers form definite complexes with the Friedel-Crafts catalyst and are easily isolated. While definite isolatable complexes are formed with one mol of ether per mol of Friedel-Crafts catalyst, it may often be desirable to have the mol ratio of ether to Friedel-Crafts reagent as high as 10 or 20 in the final catalyst solution. With some of the Friedel-Crafts catalyst complexes, it is preferable to prepare the complex in solution and keep it so until used. The composition of the isolated complex compounds for all of the Friedel-Crafts catalyst substances appears to be in the neighborhood of one mol of ether per mol of the active metal catalyst, any excess ether acting as a solvent for the complex.

Depending upon the conditions employed the catalysts of this invention may be used to synthesize hydrocarbons boiling in the gasoline range, safety fuels, solvents, high molecular weight polymers suitable as lubricants, lubricant addition agents, etc. The etherate complexes are particularly effective in promoting simultaneous polymerization-alkylation reactions whereby liquid products boiling in the motor fuel range and high boiling polymers are produced in the same process.

In practicing the invention, there is prepared an etherate complex by dissolving the ether in a solvent such as carbon disulfide or methyl chloride and boiling the solvent with the suspended aluminum chloride until solution is complete. The complex or addition compound may then be recovered by evaporating off the solvent or by recrystallization in the solvent. For example, one-tenth mol of anisole is dissolved in 100 cc. of methyl chloride and one-tenth mol of solid aluminum chloride is added and the solution boiled to speed the solution of the solid. The solid complex compound is recovered by crystallization from methyl chloride. The preparation is very simple and beautiful fine crystals are obtained which are much less reactive with water than is aluminum chloride. The complex etherate is highly soluble in methyl chloride so that the preparation of the catalyst solution is simplified. With the complex $Al_2Cl_6 \cdot 2C_6H_5OCH_3$ a concentration containing as much as 35 g. aluminum chloride per 100 cc. methyl chloride is possible and this solution has a boiling point above room temperature (25° C.). This concentrated catalyst solution may be diluted one to two hundredfold, in preparing the catalyst solution. This complex is moreover soluble in hydrocarbons, in fluorinated and in chlorinated hydrocarbons in which aluminum chloride is too insoluble to be useful as a catalyst.

For the Friedel-Crafts catalyst, any of the catalysts shown by N. O. Calloway in his article on "The Friedel-Crafts synthesis" printed in the issue of "Chemical Reviews," published for the American Chemical Society at Baltimore in 1935, in Volume XVII, No. 3, the article beginning on page 327, the list being particularly well shown on page 375, may be used, and all are more or less effective, operating with varying degrees of satisfaction.

Any type of aromatic or saturated aliphatic ethers may be used, substituted or not. The lower dialkyl ethers, dimethyl to dipropyl, form useful complex compounds with aluminum chloride. The symmetrical substitution of a halogen in the lower alkyl ethers leads to active complex compounds. For example, the $\alpha, \alpha'$ dichloro methyl ether and $\beta, \beta'$ dichloro ethyl ether form useful catalysts with aluminum chloride. The aryl, alkyl mixed ethers are all suitable complex forming compounds. Examples of these types are o-chloro phenyl ethyl ether and $\beta$ chloro ethyl phenyl ether, both of which are satisfactory catalyst solvents for aluminum chloride and titanium tetrachloride. The nitro-aryl ethers such as o-nitro anisole or o-nitro diphenyl ether are likewise useful complex forming compounds. The di-ethers of the type of 1, 2, di-phenoxy ethane are useful in complex compound formation with both aluminum chloride and titanium tetrachloride. The cyclic ethers of the type of dibenzofurane are also useful.

The complex catalysts enumerated above may be used in the ordinary isomerization reactions or in alkylation reactions in which olefins are reacted with isoparaffins. However, these catalysts are particularly suitable for carrying out simultaneous or successive polymerization and alkylation reactions. For example, isobutylene may be polymerized to the trimer and tetramer in the presence of these complexes under polymerization conditions and the trimer or tetramer then alkylated with an isoparaffin in the presence of the same complex catalyst under alkylation conditions.

Suitable olefins for use in this process include ethylene, propylene, butene-1, butene-2, isobutylene, gases containing mixtures of these compounds obtained in cracking petroleum hydrocarbons, etc.

Suitable isoparaffins include isobutane, isopentane, although higher isoparaffins may be used. Likewise isoparaffins containing more than one tertiary carbon atom are suitable, such as 2,3-dimethyl butane, 2,3,4-trimethyl pentane, 2,3-dimethyl pentane, 2,3-dimethyl hexane and 2,2,3,4-tetramethyl pentane. For the alkylation reaction, fairly wide ranges of isoparaffin-olefin ratios may be employed, from 1 volume per cent of the olefin in the isoparaffin feed up to equal quantities of olefin or isoparaffin or even greater. The temperature employed will vary somewhat with the specific catalyst employed but in general may vary from —100° C. to +100° C. Temperatures from —20° C. to +10° C. are particularly suitable for carrying out alkylation and combined alkylation-polymerization reactions, while temperatures above +10° C. are suitable for isomerization reactions. Depending upon the vapor pressure of the liquid, it is possible to operate over a wide range of pressure. Atmospheric pressure is satisfactory for this type of operation although superatmospheric pressures may be employed and in certain cases may be actually advantageous. Any of the well known promoters may be employed for the alkylation reaction, such as hydrogen chloride. However, such promoters are not essential.

The catalyst may be prepared in a number of different ways. Thus, desired amounts of the Friedel-Crafts catalyst, usually aluminum chloride, and the desired ether may be added to ethyl or methyl chloride or carbon disulfide, as desired, and the mixture stirred or shaken until solution is complete. It may be noted that the solubility of aluminum chloride in methyl or ethyl chloride is much higher in the presence of equimolar amounts of ether, indicating some sort of a co-reaction or compound formation. Also in most instances, the complex of aluminum chloride and ether may be recovered in pure crystal form by allowing the solvent such as ethyl or methyl chloride or carbon disulfide to evaporate until most of the catalyst complex has precipitated and then recrystallized. With aluminum chloride, diethyl ether forms colorless plates, melting at 33°–35° C. whose molecular formula is $Al_2Cl_6.2C_2H_5OC_2H_5$; this complex is completely decomposed at 106° C. Di-n-propyl ether forms a red liquid complex of the composition $Al_2Cl_6.2C_3H_7OC_3H_7$. These reactions are carried out at 35°–50° C. without diluent; the resulting sirup is cooled to crystallize the complex which is then recrystallized from ether and dried over sulfuric acid.

The preparation of the aryl ether complexes has usually involved the addition of solid aluminum chloride to a carbon disulfide solution of the ether with subsequent recrystallization of the complex compound from this solvent. This method has been applied for the preparation of the diphenyl etherate and the phenyl methyl etherate, $Al_2Cl_6.2(C_6H_5)_2O$ and $Al_2Cl_6.2C_6H_5OCH_3$. Molecular weight and empirical analyses established the formulae indicated. The anisole and diphenyl ether complexes prepared by this procedure varied in color; the original preparations were pink but the color intensified on standing.

Methyl chloride has been used for these preparations with considerable advantage since the etherates are obtained as colorless well crystallized solids. The solubilities of the complexes, $Al_2Cl_6.2C_6H_5OC_6H_5$ and $Al_2Cl_6.2C_6H_5OCH_3$, in methyl chloride are equivalent to about 23 and 35 g. $AlCl_3/100$ cc. $CH_3Cl$ at the boiling point of the saturated solutions (ca. 20° C.). In the experimental preparation of various etherates of aluminum chloride, methyl chloride was used as the solvent. In most experiments the desired mol ratios of aluminum chloride and ether or oxy compound were dissolved in methyl chloride and the complex isolated by evaporation to dryness. The high solubility of aluminum chloride in methyl chloride containing aryl ethers is a good indication of complex compound formation.

The initial study of etherates of Friedel-Crafts catalysts was carried out by dissolving 0.5–1.0 g. of either aluminum chloride or titanium tetrachloride in about 20 ml. of the ether. The reactions involved were the formation of the complex compound and its solution in the excess ether. The ethers used successfully for catalyst solvents are: diphenyl ether, phenyl methyl ether, o-chlorophenyl ether, β-chloroethyl phenyl ether and ββ′ dichloroethyl ether. In these solutions the mol ratio ether to aluminum chloride varied from 20 to 40 depending upon the molecular weight of the ether. The generality of this ether behavior is illustrated by the use of aluminum chloride, titanium tetrachloride and boron fluoride as the Friedel-Crafts catalysts.

The preparation of catalyst solutions by dissolving the Friedel-Crafts catalysts directly in an ether is very simple and yields solutions of very high concentration of the Friedel-Crafts type catalysts. These high concentrations of active metal halide catalysts may be utilized directly or after dilution for the processes of this invention. This procedure is particularly advantageous in the case of boron trifluoride, which forms the liquid compound $BF_3.(ClCH_2CH_2)_2O$ containing about 32 wt. per cent $BF_3$ and is obtained by saturating β β′ dichloroethyl ether at room temperature with the gaseous boron fluoride. This liquid complex etherate may be employed directly or after dilution in alkylation reactions. The aluminum chloride complex with this halogenated ether is also a liquid at room temperature.

The colors of these complex catalyst solutions are indicated in the following tabulation:

| Friedel-Crafts Catalyst | $AlCl_3$ | $TiCl_4$ | $BF_3$ |
| --- | --- | --- | --- |
| Ether | | | |
| Diphenyl ether | Brown | Dark reddish brown | |
| Phenyl methyl ether | Pink | | Yellow. |
| O-chlorophenyl ethyl ether | Purple | Dark reddish brown | Do. |
| β chloroethyl phenyl ether | Orange | do | Do. |
| ββ′ dichloro ethyl ether | Brown | do | Do. |

These color effects are not necessarily characteristic of these solutions of complex Friedel-Crafts compounds since the isolated pure complexes of diphenyl ether and anisole are colorless when freshly prepared in methyl chloride but develop the indicated colors on standing in contact with the dry atmosphere.

The following experiments demonstrate the operability of the complexes of this invention for preparing useful products.

*Example I*

477 grams of gaseous propylene was slowly passed through a solution of 21.6 g.

$Al_2Cl_6.2(ClCH_2CH_2)_2O$ complex in 400 cc. isobutane for eight hours at a temperature of about —20° C. under reflux. After the reaction was completed, the catalyst was killed with water and the product was washed with water to remove the catalyst. A yield of 600 cc. of a red gas free oil was obtained, having the following properties:

Bromine number _____ 0
Engler distillation:
    50% point, °C _____ 138
    75% point, °C _____ 200
    95% point, °C _____ 210

The ASTM octane number of the fraction boiling up to 200° C. was 75.9.

*Example II*

The procedure of Example I was repeated using the same catalyst, at 0° C. The product obtained under these conditions inspected as follows:

Bromine number _____ 0
Butane free product _____ cc. 594

Engler distillation:
- 50% point, °C _____ 127
- Per cent over at 201° C _____ 94
- ASTM octane number _____ 88

Example III 1700 grams of gaseous isobutane was passed into a solution of 40 grams of BF$_3$(ClCH$_2$CH$_2$)$_2$O in 4000 grams of isobutane for 6.2 hours and reacted with the isobutane under reflux conditions at a temperature initially at −20° C. which was slowly warmed to −15° C.

After the reaction was completed, the polymerized and alkylated product was washed with cold water to remove the catalyst and then dried over calcium chloride to remove water at room temperature. 3150 grams of a butane-free product was obtained having a bromine number of 0, an ASTM octane number of 89 and containing 0.31% fluorine. Engler distillation of this product yielded:

50% over at 157° C.
Per cent over at 201° C. (E. P.) 93

Example IV

A mixture consisting of 400 grams of isobutane and 500 grams of isobutylene was placed in a two liter flask, which was attached to a large Dry-Ice reflux condenser. TiCl$_4$.(ClCH$_2$CH$_2$)$_2$O catalyst (50 g.) in 300 cc. ethyl chloride was then added. The mixture refluxed for six hours. The liquid reaction mixture was washed with water under pressure. The pressure was released, water removed, and hydrocarbons separated by a distillation step.

308 ml. of product having a bromine number of 0 were taken overhead. This product was condensed and subjected to Engler distillation with the following results:

- 50% point, °C _____ 140
- 75% point, °C _____ 205
- 95% point, °C _____ 230

The above results are calculated on the volume of material (308) that went overhead.

The bottoms product consisted of 250 g. of very high molecular weight polymer (approximately 6,000 molecular weight Staudinger). This high molecular weight polymer is suitable as an additive to lube oils, wax, etc.

Example V 1515 grams of gaseous propylene was slowly passed through a solution of 25 g.

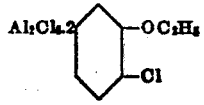

complex in 1500 cc. isobutane for eight hours at a temperature of about −20° C. under reflux. After the reaction was completed, the catalyst was killed with water, and the product was washed with water to remove catalyst. A yield of 1620 cc. of a red gas-free oil was obtained, having the following properties:

- Bromine No _____ 0
- Engler distillation:
  - 50% point, °C _____ 118
  - 75% point, °C _____ 203
  - 95% point, °C _____ 212
- ASTM octane No _____ 83

Example VI 1700 grams of gaseous isobutane was passed into a solution of 25 grams BF$_3$.C$_6$H$_5$OCH$_3$ in 4000 grams of isobutane for six hours and reacted with the isobutane under reflux conditions at a temperature from −20° C. to −13° C.

After the reaction was completed, the polymerized and alkylated product was washed with cold water to remove the catalyst and then the water was separated from the hydrocarbon mixture. The product was distilled and yielded 3000 grams of a butane-free hydrocarbon mixture, having a bromine number of 0 and an ASTM octane number of 80. Engler distillation of this product yielded:

50% over at 139° C.
Per cent over at 205° C. (E. P.) 92

Example VII 3000 grams of a refinery crude C$_4$ cut was placed in a five liter flask, which was attached to a large Dry-Ice reflux condenser. The cut was made up from a large number of materials. However, chemical tests indicated that the cut contained 480 grams of isobutylene and 830 grams of secondary C$_4$ type olefins. About 30 grams of butadiene was present. The rest of the cut was made up of saturated hydrocarbons and some sulfur compounds. To this mixture under reflux was added 29 grams of Al$_2$Cl$_6$.2(C$_6$H$_5$OCH$_3$) complex. The temperature was held at about −10° C. for six hours. At the end of the reaction, the product was washed with water, and the water was removed by settling. 1030 grams of product having a bromine number of 0 were obtained and subjected to an Engler distillation with the following results:

- 50% point _____ °C __ 127
- 85% point _____ °C __ 232

At the conclusion of the Engler distillation, about 10–15% of a high molecular weight polymer was left in the flask. This polymer is suitable as lubricating oil additive, etc.

Example VIII

A mixture consisting of 1400 grams of isobutane and 500 grams of isobutylene was placed in a five liter flask, which was attached to a large Dry-Ice condenser. 20 grams of TiCl$_4$.C$_6$H$_5$OCH$_3$ complex catalyst, were then added and the mixture refluxed at −10° C. for five hours. After this the product was treated with 20 grams of water to kill catalyst. The water was then removed by settling.

720 ml. liquid C$_4$ free product were obtained with 0 bromine number and subjected to an Engler distillation with the following results:

- 50% Engler distillation, °C _____ 103
- 75% Engler distillation, °C _____ 212

At the conclusion of the Engler distillation about 20% of a high molecular weight polymer was left in the flask. This polymer is suitable as a lubricating oil additive.

Example IX 3000 grams of a refinery crude C$_4$ cut was placed in a five liter flask, which was attached to a large Dry-Ice reflux condenser. The crude cut was made up from a number of materials. However, chemical tests indicated that the cut had 480 grams of isobutylene and 830 grams of secondary C$_4$ type olefins. About 30 grams of butadiene was present. The rest of the cut was made up of saturated hydrocarbons and some sulfur compounds. To this mixture under reflux was added 100 grams of $BF_3.(C_2H_5)_2O$ complex. The mixture was reacted for five hours at $-10°$ C. At the end of the run, the product was washed with water and then the water was removed by settling. Inspection of the $C_4$-free hydrocarbon (800 grams) shows the following:

Engler distillation:
  50% point _____°C__ 99
  95% point _____°C__ 188
Bromine No _____ 0
ASTM octane number _____ 78

*Example X*

In order to determine the effect of the complex catalysts of this invention on the isomerization of paraffin hydrocarbons, 13.84 grams of normal butane was isomerized at 20°–25° C. in the presence of 5.54 grams dissolved $AlCl_3.C_6H_5OCH_3$ complex catalyst while exposing the reaction tube to sunlight for nine hours. At the end of this time, it was found that 32.5 mol per cent of isobutane had been formed.

*Example XI*

In order to determine the effect of the complex catalysts of this invention on the alkylation of di-isobutylene with isoparaffins, 1500 grams of a refinery feed having the following composition

| Volume Per Cent | Constituents |
|---|---|
| 7 | Gas (propane and butane). |
| 3 | Heads—Intermediate ($C_5$ and $C_6$ hydrocarbons). |
| 62 | Di-isobutylene (102.9°–104.9° C.). |
| 23 | Co-dimer[1] (104.9°–116.7° C.). |
| 5 | Tri-isobutylene (144° C. to 165° C.). |

[1] Copolymer of isobutylene and butadiene.

were treated with 800 grams of a $C_5$ and $C_4$ refinery cut that contained 390 grams of isoparaffins. To this mixture, held under reflux, was added 25 grams of $Al_2Cl_6.2(C_6H_5OCH_3)$ in 50 grams of ethyl chloride. The reaction was conducted at about $-15°$ C. to $+10°$ C. for eight hours and then the temperature was increased to $+15°$ to $+17°$ C., under pressure for about 55 hours. At the end of the run, water was added to kill the catalyst. By settling water was removed from the hydrocarbon. The final product ($C_5$- and $C_4$-free) was analyzed as follows

[Volume ($C_5$- and $C_4$-free)—1620 grams.]

| Volume Per Cent | Constituents |
|---|---|
| 2 | Boiling Point below 102.9° C. |
| 14 | Di-isobutylene (102.9°–104.9° C.) |
| 39 | 104.9°–117° C. |
| 27 | 117°–119° C. |
| 13 | 119°–144° C. |
| 5 | 144°–165° C. |

The product boiling from 104.9° to 144° C. is suitable as a solvent, safety fuel, etc.

Although the invention has been described in connection with specific details of certain embodiments thereof, it is not intended that such details shall be considered as limiting the scope of the invention except insofar as indicated in the following claims.

The nature and objects of the present invention having been thus fully set forth and specific examples of the same given, what is claimed as new and useful and desired to be secured by Letters Patent is:

1. A process for converting hydrocarbons comprising contacting said hydrocarbons at temperatures between $-100°$ and $+100°$ C. with a catalyst comprising a complex of a Friedel-Crafts type catalyst with a chlorinated ether.

2. A process for preparing motor fuel and high molecular weight polymers by simultaneous polymerization and alkylation comprising reacting an olefin with an isoparaffin in the presence of a catalyst comprising a complex of a Friedel-Crafts type catalyst with a chlorinated ether.

3. A process for preparing branched chain hydrocarbons which comprises contacting a straight-chain hydrocarbon with a catalyst comprising a complex of a Friedel-Crafts type with a chlorinated ether.

4. A process for preparing high antiknock fuels comprising reacting an olefin with an isoparaffin in the presence of a catalyst comprising a complex of a Friedel-Crafts type with a chlorinated ether.

5. A process for preparing high antiknock fuels comprising reacting propylene with isobutane in the presence of a complex catalyst having the formula $Al_2Cl_6.2(ClCH_2CH_2)_2O$ at $-20°$ C.

6. A process for preparing high antiknock fuels comprising reacting isobutylene with isobutane in the presence of a complex catalyst having the formula $BF_3(ClCH_2CH_2)_2O$ at $-20°$ C.

RALPH W. DORNTE.
DAVID W. YOUNG.

REFERENCES CITED

The following references are of record in the file of this patent:

UNITED STATES PATENTS

| Number | Name | Date |
|---|---|---|
| 2,311,531 | Fulton | Feb. 16, 1943 |
| 2,338,568 | Bartlett | Jan. 4, 1944 |
| 2,359,810 | Tripp | Oct. 10, 1944 |
| 2,368,653 | Francis | Feb. 6, 1945 |